United States Patent
Cohen

(10) Patent No.: US 8,369,653 B1
(45) Date of Patent: Feb. 5, 2013

(54) SYSTEM AND METHOD FOR IMAGE UPSAMPLING USING NATURAL IMAGE STATISTICS OF FIRST AND SECOND DERIVATIVES

(75) Inventor: Scott D. Cohen, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 954 days.

(21) Appl. No.: 12/395,316

(22) Filed: Feb. 27, 2009

(51) Int. Cl.
  *G06K 9/32* (2006.01)
(52) U.S. Cl. .......... 382/299; 382/298; 382/300
(58) Field of Classification Search .......... None
  See application file for complete search history.

(56) References Cited

U.S. PATENT DOCUMENTS

| | | | |
|---|---|---|---|
| 5,796,877 A * | 8/1998 | Gusmano | 382/298 |
| 2001/0026643 A1 * | 10/2001 | Yamada | 382/276 |
| 2002/0172434 A1 | 11/2002 | Freeman et al. | |
| 2004/0066981 A1 * | 4/2004 | Li et al. | 382/286 |
| 2005/0169548 A1 * | 8/2005 | Ducksburg et al. | 382/240 |
| 2006/0038891 A1 | 2/2006 | Okutomi et al. | |
| 2006/0159369 A1 | 7/2006 | Young | |
| 2007/0019887 A1 * | 1/2007 | Nestares et al. | 382/299 |
| 2009/0022226 A1 * | 1/2009 | Bang et al. | 375/240.16 |

OTHER PUBLICATIONS

Zhang et al., "A Single Image Based Blind Super-Resolution Approach", IEEE ICIP 2008, 15th IEEE International Conference on Image Processing, Dec. 12, 2008, pp. 329-332.*

Levin et al., "User Assisted Separation of Reflections from a Single Image Using a Sparsity Prior", IEEE Transactions on Pattern Analysis and Machine Intelligence, Sep. 2007, vol. 29, No. 9, pp. 1647-1655.*

D. Capel, "Image Mosacing and Super-Resolution", 2004, Spring-Verlang, Chapter 6—"Super Resolution Using Bayesian Priors". pp. 137-168.*

Schultz et al., "Extraction of High-Resolution Frames from Video Sequences" Jun. 1996, IEEE Transaction on Image Processing, vol. 5, No. 6, pp. 996-1011.*

S. Dai, M. Han, W. Xu, Y. Wu, and Y. Gong. Soft edge smoothness prior for alpha channel super resolution. CVPR, pp. 1-8, 2007.

Q. Shan, Z. Li, J. Jia, and C.-K. Tang. Fast image/video upsampling supplementary file. 2008 http: //www.cse.cuhk.edu.hk/~leojia/projects/ upsampling/deconvolution.pdf.

M.F.Tappen, B.C. Russell, and W.T. Freeman. Exploiting the sparse derivative prior for super-resolution and image de-mosaicing. In SCTV, 2003.

* cited by examiner

*Primary Examiner* — Chan S Park
*Assistant Examiner* — David Perlman

(57) ABSTRACT

Systems and methods for upsampling input images may evaluate potential upsampling solutions with respect to an objective function that is dependent on a sparse derivative prior on second derivative(s) of the potential upsampling solutions to identify an acceptable higher-resolution output image. The objective function may also be dependent on fidelity term(s) and/or sparse derivative prior(s) on first derivative(s) of potential upsampling solutions. The methods may include applying the iteratively re-weighted least squares procedure in minimizing the objective function and generating improved candidate solutions from an initial solution. The identified solution may be stored as a higher-resolution version of the input image in memory, and made available to subsequent operations in an image editing application or other graphics application. The methods may produce sharp results that are also smooth along edges. The methods may be implemented as program instructions stored on computer-readable storage media, executable by a CPU and/or GPU.

35 Claims, 12 Drawing Sheets

SYSTEM AND METHOD FOR IMAGE UPSAMPLING USING NATURAL IMAGE STATISTICS OF FIRST AND SECOND DERIVATIVES

BACKGROUND

Description of the Related Art

Graphic applications include an ever-increasing number of image editing features, such as various filtering options, image feature relocation operations, and resizing operations (e.g., for cropping, expanding, or reducing an image). Some applications provide an upsampling operation, sometimes referred to as a "super-resolution" operation, by which the resolution of images can be increased. Increasing the resolution of a digital image is a fundamental operation in image processing.

The problem of image upsampling is severely under-constrained. When increasing the resolution of an image by a factor of k in each image dimension, there are $k^2$ times as many output pixels as there are input pixels. Some common methods for synthesizing the values of pixels added to a higher-resolution version of a low-resolution input image include:

Taking each pixel of the input image and duplicating the pixel's value for multiple pixels of the output image corresponding to that pixel in the input image. For example, an input image pixel value may be duplicated in pixels to the right, bottom, and bottom-right of the original pixel in the output image. One such upsampling method is referred to as a "nearest neighbor" technique. Such methods are simple to apply, but the results may be "blocky." In other words, the output image will contain blocks of pixels that look like the pixels of the input image, but are larger, which may make the underlying grid visible to the user.

Interpolating between the values of adjacent pixels of the input image to determine the values of additional pixels placed between each pair of pixels in the output image. For example, bilinear and bicubic interpolation functions are popular. These methods fit a curve through existing data and decide on the values of output image pixels using a value at some intermediate point along the curve.

Upsampling methods based on interpolation may not produce natural-looking images. These methods tend to blur edges found in the input images by filling in pixels of varying values between two pixels that have very different values (e.g., at the edge of an image element). For example, if two adjacent pixels in an input image have values of 0 and 1, indicating the edge of an image element, an upsampling operation based on interpolation may result in the corresponding location in the output image containing pixels having values of 0, 0.13, 0.26, 0.39, 0.48, 0.61, 0.74, 0.87, and 1.0. Thus, the edge found in the input image may be blurred in the upsampled version of the image.

Because upsampling is an under-constrained problem, some assumptions are needed to regularize the problem. Some regularization strategies use the statistics of natural images to impose a prior on the output. For example, two common priors are that output edges should be sharp and that there should be smoothness along edges. The edge smoothness prior discourages the magnification of the underlying pixel grid.

A data driven approach to upsampling looks for pixels to synthesize from an image database. One such approach learns a small number of linear transformations that map low-resolution patches to high-resolution patches in natural images. Belief propagation is then used to solve a labeling problem with a small number of labels for each high-resolution patch, where a label indicates which linear transformation is applied to a low-resolution patch. This optimization procedure is quite complex. Along with the usual fidelity term, a sparse derivative prior on first derivatives is sometimes used to promote sharpness. Another data driven upsampling approach searches a database of pairs of low-resolution image patches and high-resolution image patches for matches with areas in the low-resolution input. This approach is capable of adding new detail, not simply enhancing information already present in the input, but results in very visible artifacts when there are not very precise matches present in the database. Still other upsampling methods are reconstruction-based methods that use image priors.

SUMMARY

A system and method for upsampling input images may evaluate each of a plurality of potential upsampling solutions with respect to an objective function that is dependent on a sparse derivative prior on one or more second derivatives of the potential upsampling solution to identify an acceptable higher-resolution version of the input image. Once an acceptable higher-resolution image is identified, and/or following a defined number of iterations of the upsampling methods, the identified solution may be stored as a higher-resolution version of the input image in memory, and may be made available to subsequent operations in an image editing application or another application, in various embodiments. The methods for upsampling images described herein may produce sharp results that are also smooth along edges, as compared to existing upsampling methods, and may be simple and efficient to implement while yielding state-of-the-art results.

The potential upsampling solutions evaluated may represent the set of all possible upsampling solutions, in some embodiments. In other embodiments potential solutions may be iteratively generated during the upsampling operation in response to the evaluation of each previous potential solution. An initial candidate solution may consist of default pixel values, or pixel values determined automatically by the system, in different embodiments, and each subsequent candidate solution may be generated based on iteratively minimizing the objective function.

In some embodiments, the objective function may be further dependent on a sparse derivative prior on one or more first derivatives of the potential upsampling solution. The objective function may be dependent on a sparse derivative prior on a derivative of the potential upsampling solution in a direction other than horizontal or vertical, in various embodiments. The objective function may be further dependent on a fidelity term configured to bias the evaluation toward potential upsampling solutions that closely resemble the input image, and this fidelity term may be dependent on a blur kernel. In some embodiments, the blur kernel, and/or parameters thereof (e.g., shape or spread), may be configurable by a user, e.g., through a graphical user interface. In other embodiments, the blur kernel and/or its parameters may be fixed or may be determined automatically by the system based on parameters found to be well correlated with low-resolution or higher-resolution images similar to the input image. In one embodiment, the blur kernel comprises a box filter convolved with a disk.

In various embodiments, one or more other parameters of the upsampling operation may be configurable by a user, such as an upsampling factor, a target output image resolution, an output image size, a target relative resolution, a number of derivatives, an order of a derivative, a direction of a derivative, or a number of solution iterations.

In some embodiments, identifying one of the plurality of potential upsampling solutions as an acceptable solution may include minimizing the objective function using an iteratively re-weighted least squares procedure, which approximates the non-convex problem with a linear problem. Each step of the iterative least squares procedure may be solved using any of various linear solvers, such as a MINRES solver. In some embodiments, the objective function may model the sparse derivative prior as a zero mean Generalized Gaussian Distribution.

In some embodiments, the upsampling methods described herein may be performed on each of two or more image planes of the input image. In some embodiments, the input image may be converted to a different image representation than that of the input image and the upsampling methods may be applied to the converted representation of the input image.

The upsampling methods described herein may be applied to the entire input image at once, or may be applied to one or more portions of the image, in different embodiments. In one example, the upsampling methods may be applied to pixels of the input image in the neighborhood of an image element edge, while other, perhaps simpler, upsampling methods may be applied to the pixels within a given image element.

The methods described herein may be implemented as program instructions, (e.g., stored on computer-readable storage media) executable by a CPU and/or GPU, in various embodiments. For example, they may be implemented as program instructions that, when executed, implement an image editing application responsive to user input. This image editing application may be used to perform image upsampling operations using the upsampling methods described herein. The selection of particular image upsampling operations to be applied to selected input images (and/or parameters of the upsampling operation) may be specified by the user (e.g., through a graphical user interface), in some embodiments.

Figure 1:
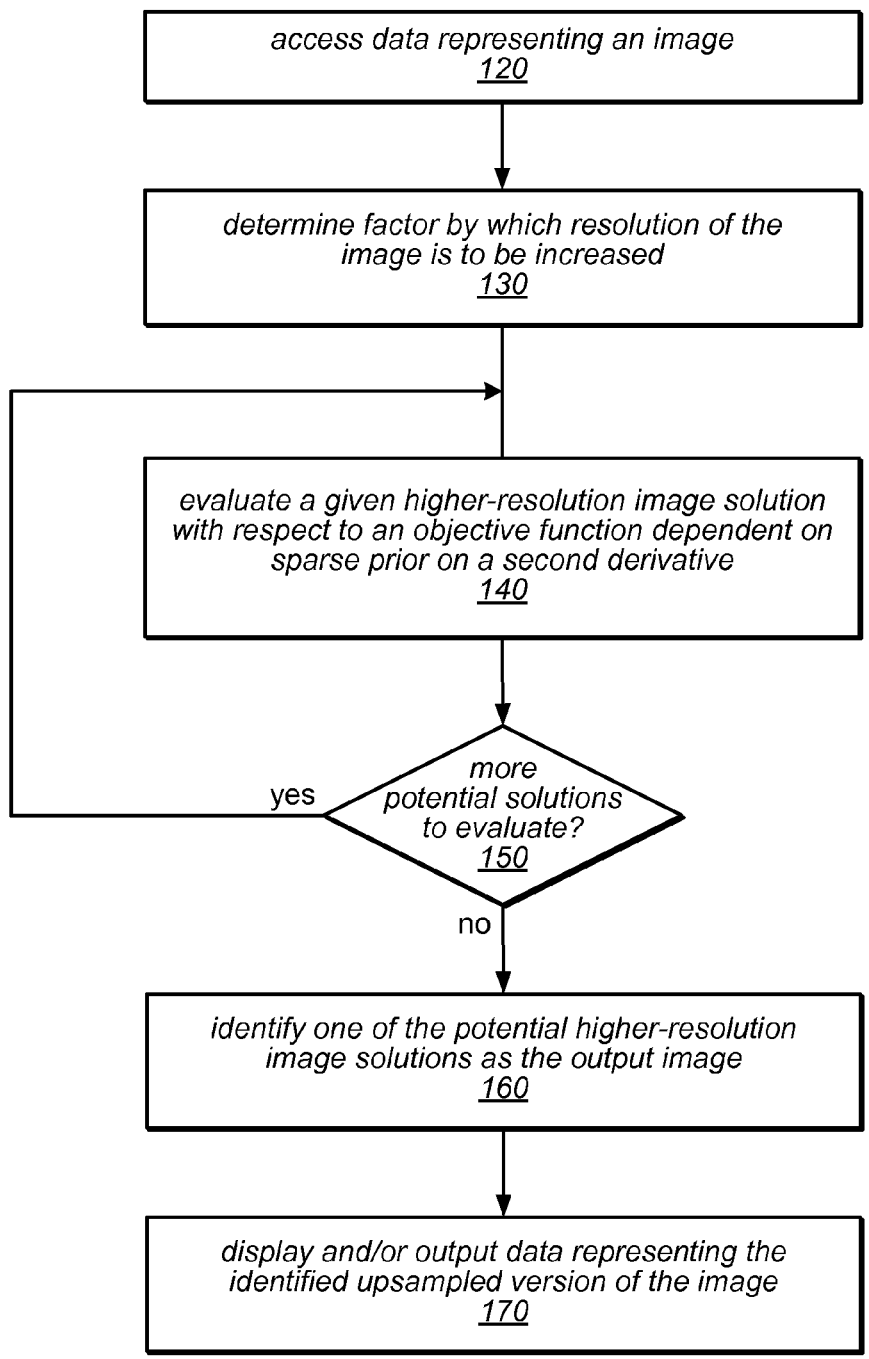
FIG. 1 is a flow diagram illustrating a method for upsampling an image in a graphics application, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

As noted above, graphic applications include an ever-increasing number of image editing features, and may provide an upsampling operation for increasing the resolution of images. In some embodiments, an image editing application may provide a framework that integrates an upsampling operation and other image editing operations through an interactive user interface, e.g., a graphical user interface. The application may implement a method for upsampling digital images that produces sharp results that are also smooth along edges. The method may use the sparse derivative prior (SDP), which encourages heavy-tailed distributions of derivatives, to regularize the under-constrained upsampling problem. Unlike most other image inverse problem work, the sparse derivative prior may be applied to both first and second derivatives. Applying the sparse derivative prior to first derivatives may impose a sharpness prior. In some embodiments, its application to second derivatives in addition to first derivative may promote smoothness along edges. The method may include the use of an iteratively re-weighted least squares (IRLS) procedure to optimize an objective function that encourages a blurred, down-sampled version of the output to be similar to the input and the distribution of several first and second derivative filters to follow the sparse derivative prior. This method may be simple to implement, as IRLS may require only a linear system solver, and may yield state-of-the-art results. The method may model the derivative distributions with Generalized Gaussian distributions (GGDs).

One embodiment of a method for performing upsampling using sparse derivative priors on first and second derivatives is illustrated in FIG. 1. In this example, the method includes accessing data representing a low-resolution input image, as in 120. For example, data representing an image may be accessed in response to user input identifying the image as the subject of an upsampling operation. As illustrated at 130, the method includes determining a factor by which resolution of the input image is to be increased. For example, in various embodiments, a user may provide input specifying an upsampling factor (e.g., ×4, ×8), specifying the target resolution of a higher-resolution version of the input image (e.g., 2000× 2000 pixels), or specifying a target size and corresponding relative resolution for the output image (e.g., 4×4 inches at 500 dpi). If a target resolution is specified, or if a target size and corresponding relative resolution are specified, the method may include calculating an upsampling factor dependent on the resolution of the input image and the specified targets for the higher-resolution output image. In other embodiments, the method may include programmatically determining an appropriate upsampling factor to be applied a lower-resolution image to generate a higher-resolution version, e.g., using a default value and/or a value dependent on the resolution of the lower-resolution input image, on the context in which the upsampling operation is being applied (e.g., as part of another image editing application), or on other factors.

As discussed herein, upsampling an image may involve "filling in" unspecified data for pixels added to the data representing the image for the higher-resolution image. Various objective functions may then be applied to all possible pixel value assignments in order to determine a combination of pixel value assignments for the higher-resolution output image. In the example illustrated in FIG. 1, the method includes evaluating a given potential solution to the pixel value assignment problem with respect to an objective function that is dependent on one or more sparse derivative priors on a second derivative of the potential solution, as in 140. For example, an objective function that includes one or more sparse derivative prior terms on second derivatives may favor solutions that exhibit properties of natural images and may penalize those solutions that do not exhibit those properties by making them more "expensive". As discussed in more detail below, the number and/or gradient direction of sparse derivative priors on second derivatives may vary in different embodiments.

As illustrated by the feedback loop from 150 to 140 in FIG. 1, the method may include repeating the evaluation operation for one or more other potential solutions, and identifying one of the potential solutions as the output image for the upsampling operation, as in 160. For example, if an input image having n pixels is to be upsampled by a factor k in each image dimension, there will be $k'=k^2$ times as many pixels in the output image as in the input image. If each pixel may have one of eight different intensity values, the number of potential solutions to the pixel value assignments in the output image would be $8^{k'n}$. In some embodiments, an exhaustive search approach may include evaluating all possible solutions to the upsampling operation. In embodiments using this approach, once all of the potential solutions have been evaluated, the method may include identifying the higher-resolution output image solution that has the lowest cost with respect to the objective function. Such an exhaustive search approach may in some cases be impractical, given the number of potential solutions (e.g., for anything other than very small input and output images, or very small portions of a larger image).

In some embodiments, rather than applying an exhaustive search approach, the method may include generating an initial candidate solution, using any one of a variety of approaches, and iteratively generating one or more other candidate solutions (making changes to the previous candidate at each step) until an acceptable solution is identified. For example, an initial solution may include default values for all output image pixels (e.g., values representing all black pixels, all white pixels, or pixels of another single color), or may be generated using any of various upsampling techniques (e.g., bicubic interpolation, bilinear interpolation, nearest neighbor, etc.), as described above. The initial solution may then be evaluated using an objective function that is dependent on a sparse prior on a second derivative of the candidate solution. If the evaluation result is unacceptable (e.g., if it does not meet a pre-determined threshold or if it is not acceptable to the user), another candidate solution may be generated (e.g., based on the result of the evaluation), and so on. Various methods for evaluating candidate solutions and for generating subsequent candidate solutions are discussed in more detail below. Note that in some embodiments, the method may include generating potential solutions for which each of the pixel values correspond to the discrete pixel values to be associated with the output image (e.g., one of 8 discrete intensity values, or one of 256 discrete colors). In other embodiments, pixel values of candidate image solutions and/or other intermediate images processed by the method may not be limited to a finite number of values matching those of the target output image. For example, the pixel values in a candidate higher-resolution image may represent any real number in a range of values (e.g., 0, 0.1, 0.2 . . . 7.9, 8.0). In such embodiments, once an image solution is identified as the output image of the upsampling operation, the pixel values may be converted to match the available values in the output image (e.g., by rounding or using another suitable method).

In the example illustrated in FIG. 1, the method includes displaying and/or outputting data representing the identified solution may be output, as in 170. For example, in some embodiments, the identified higher-resolution output image may be displayed to the user, and/or may be made available to the user for printing. In other embodiments, data representing the identified higher-resolution output image may be stored in one or more data structures for further processing by a graphics application through which the upsampling operation was initiated or by another application. For example, the data may be stored by the application in memory local to the application for further processing and/or may be written to persistent storage for subsequent access by the application or by one or more other applications, in various embodiments.

When using the upsampling methods described herein to increase the resolution of color images, the methods may in some embodiments be applied independently to each color plane (e.g., to R, G, and B channels), and the results may be combined to form the output image. It is somewhat surprising that this does not lead to more color separation artifacts. A possible explanation is that the fidelity term constrains the computation enough to avoid such artifacts. In other embodiments, the methods described herein may be applied to a grey scale version of the input image or to another representation of the input image. For example, in some embodiments, the methods may be applied to a representation of an image in a different color space than that of the input image, such as one that models luminescence and chrominance. In one embodiment employing a hybrid approach, since the human eye is more sensitive to luminescence than chrominance the methods described herein may be applied to the luminescence (Y) channel of a YUV color space representation of an input image, and the results may be combined with results of a simpler upsampling operation (e.g., bilinear interpolation) being applied to chrominance.

In some embodiments, another type of hybrid approach to image upsampling may be applied in which the methods described herein (those dependent on sparse derivative priors on second derivatives) may only be used near and/or along image element edges in the input image and another approach (e.g., bicubic upsampling results) may be used for upsampling smoother portions of the input image (e.g., pixels of each image element). For example, in an image that depicts an apple sitting on a table, the methods described herein (those dependent on sparse derivative priors on second derivatives) may be applied to increase the resolution of the image in the area of transition from the apple-colored pixels to the table-colored pixels (e.g., a small number of pixels on each side of the apple's edge), while bicubic upsampling may be applied to increase the resolution of the image in the interior of the apple and the table.

The upsampling methods described herein may in some embodiments be applied to an entire input image in one upsampling operation, solving for all of the pixel values for the higher-resolution output image as part of that operation. In other embodiments, upsampling may be applied to a various portions of an image and then the higher-resolution output image may be constructed by re-assembling the higher-resolution solutions identified for each portion. In such embodiments, various constraints may be applied at the boundaries between the image portions to prevent and/or correct artifacts that may be introduce by the partitioning of the solution. For example, in one embodiment, the pixel values at the boundaries of each portion may be fixed in the output image, and may be equal to the corresponding pixel values found at the boundaries of those regions in the input image. In another embodiment, an input image may be divided into a grid of sub-images to which the methods described herein may be applied. In one such example, the methods may be iteratively applied to one or more sub-images beginning with the sub-image at the top-left corner of the input image. Once an acceptable higher-resolution output image is identified for the top-left sub-image, the sub-images to the right of this sub-image and below this sub-image may be processed, and this processing may be dependent on the values along (and/or near) the right and bottom edges of the higher-resolution output image for the top-left sub-image (e.g., those values may be fixed). This may be repeated for additional sub-images, such that pixel values along and/or near the right and bottom edges of each portion of the output image are fixed and are used in identifying solutions for adjacent sub-images. In still other embodiments, various sub-images of an input image may be processed in a random order with the addition of various constraints on the values of pixels along and/or near boundaries between the sub-images. In some embodiments, two or more sub-images for which the output image solutions are independent may be processed in parallel (e.g., using multiple processors of a graphics processing unit or by different threads of a multithreaded processor).

The methods may in some embodiments be applied to frames of a video, and may include time as an additional parameter. In other words, the methods may be applied to multiple frames of a video at a time, taking into consideration how quickly the pixel values in those frames change over time.

Statistically, a robust property of natural images is the sparsity prior or natural image prior: the distribution of band pass filter outputs tends to be sparse and have heavy tails relative to a Gaussian. In other words, natural images exhibit the property that distributions of first and second derivatives of the images have heavy tails relative to a Gaussian distribution. There is a sharp peak around zero but the occurrence of larger filter outputs is much more common than would be predicted by a Gaussian model. This behavior has been observed for simple first derivative filters and has been called the sparse derivative prior. In some embodiments, a first derivative of an image may correspond to a collection of pixels for which the value of each pixel is equal to the absolute value of the difference between the pixel's value and the value of one of its neighbors. For example, a horizontal first derivative may represent the differences between horizontally adjacent pixels of the image, while a vertical first derivative may represent the differences between vertically adjacent pixels of the image. In other embodiments, a first derivative of an image may represent the application of a different, perhaps more complex, gradient function.

In some embodiments, a second derivative of an image may correspond to a collection of pixels for which the value of each pixel is equal to the absolute value of the difference between the first derivative values of two adjacent pixels, while in other embodiments, a second derivative of an image may represent the application of another gradient function to a first derivative of the image. Natural images typically include many pixels whose values are the same (or very similar) to those of their immediate neighbors (e.g., pixels of a single image element), and also include sharp edges between image elements. The values of the pixels on either side of these edges are typically very different, and the transition between disparate pixel values occurs over a relatively small number of pixels. For example, pixel values of 0, 0, 0, 0.25, 0.5, 0.75, 1, 1, and 1 in adjacent pixels may appear as a slightly blurred edge between two image elements, which may resemble a natural-looking edge.

Figure 2A:
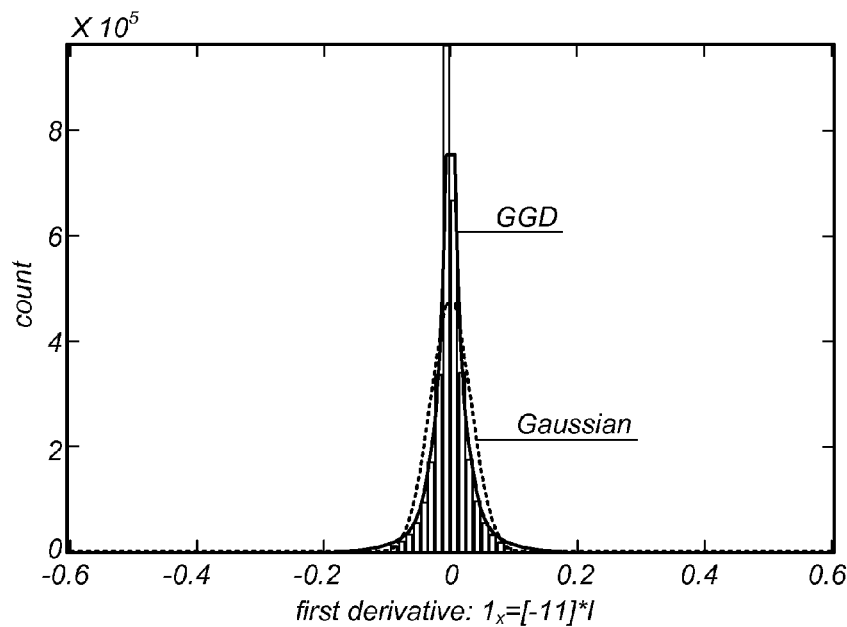
FIGS. 2A-2D illustrate various derivative distributions of a natural image, according to one embodiment.
Figure 2B:
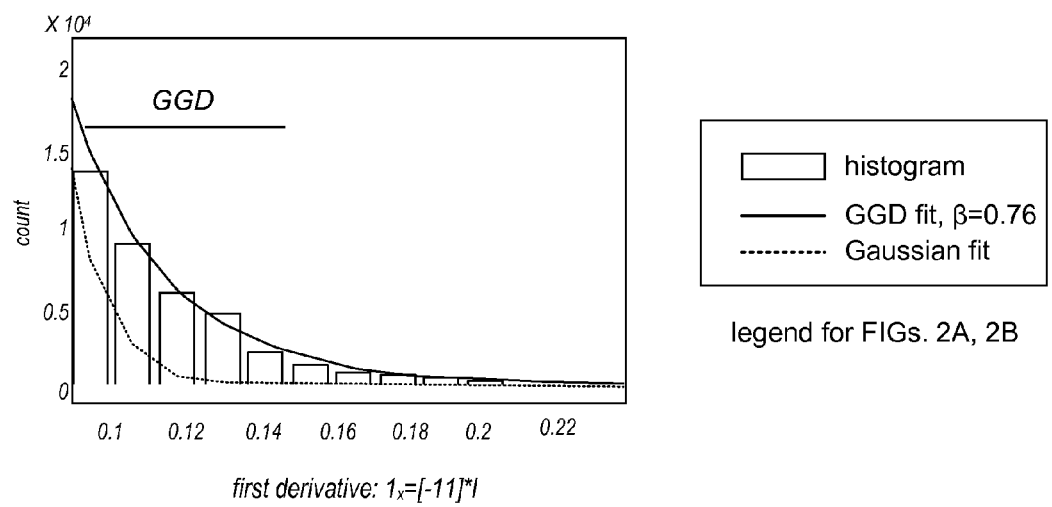
Figure 2C:
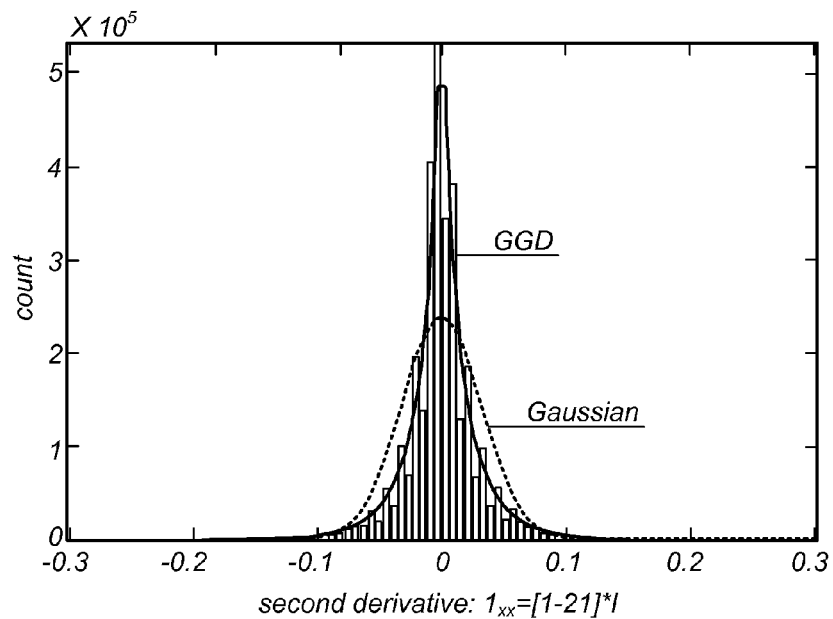
Figure 2D:
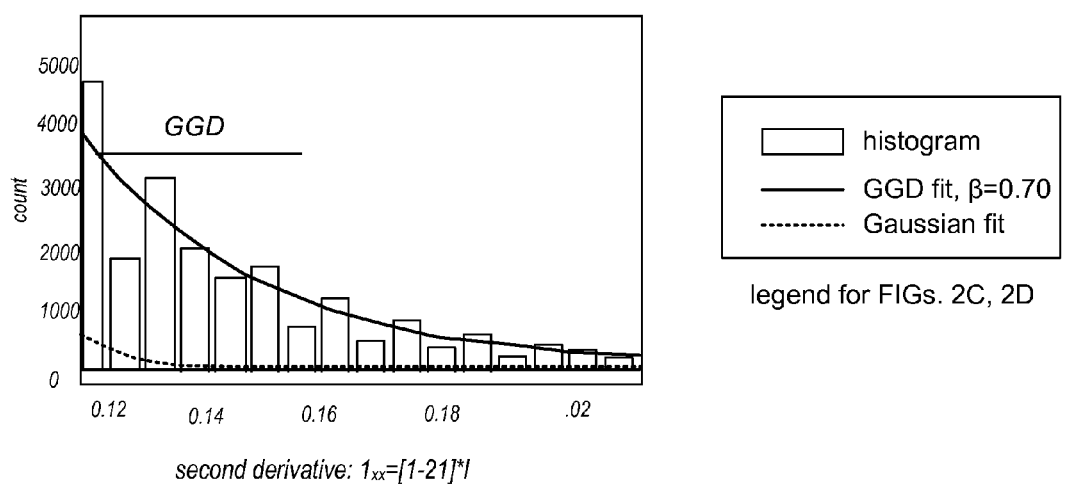

The distributions of first and seconds derivatives of natural images may look like bell curves, but with larger tails than in a Gaussian distribution, because large differences between adjacent pixels of natural images are much more likely than would be predicted by a Gaussian distribution. FIGS. 2A-2D illustrate this property using an example that models the horizontal derivatives, measured by the convolution filter [−1 1], of a given natural image with the best Gaussian distribution and Generalized Gaussian distribution (GGD) fits. Applying the convolution filter [−1 1] to an input image involves finding the differences in the values between all pairs of horizontally adjacent pixels. FIG. 2A illustrates GGD and Gaussian Maximum Likelihood fits to distributions of the outputs of a first derivative ($I_x$) as a histogram over which the best Gaussian distribution and GGD fits are superimposed. FIG. 2B is a close-up view of a portion of the distribution illustrated in FIG. 2A that more clearly illustrates the heavy tail of the distribution. FIG. 2C illustrates GGD and Gaussian Maximum Likelihood fits to distributions of the outputs of a second derivative (I) as a histogram over which the best Gaussian distribution and GGD fits are superimposed. FIG. 2D is a close-up view of a portion of the distribution illustrated in FIG. 2C that more clearly illustrates the heavy tail of the distribution. As illustrated in this example, in many natural images there is a large peak in such distributions at 0, which may not be modeled well by either distribution. In FIGS. 2A-2D, this peak is clipped off. As can be seen in this example, the GGD may model the large derivative outputs of natural images much better than the Gaussian distribution.

The methods described herein may in some embodiments bias the solution to an upsampling operation to favor those solutions among all possible solutions for which these distributions are heavily tailed. By contrast, upsampling methods that model sparse derivative priors using a Gaussian distribution tend to favor solutions with many small differences (e.g., with blurry edges between image elements).

The main objective function term or driving force in most image upsampling algorithms is one of fidelity. The fidelity term, or sensor term, is used to bias the solution such that if the computed upsampled result is blurred using the point spread function and then down sampled, the result should be very similar to the low-resolution input. This is typically expressed by penalizing $\|I^l - D B I^h\|^2$, where B is the blur operator and D is down sampling operator. In some cases, the choice of point spread function may make a noticeable difference in the computed result. In general, an upsampling method may employ any of a number of "reasonable" functions, such as a box filter or a Gaussian filter. In some embodiments, the upsampling method may include the use of a box filter (with a diameter equal to the upsampling factor) convolved with a small disk to mimic the averaging over a small area of the sensor and optical blurring. The fidelity term accounts for the image formation process. As previously noted, since the problem is under-constrained, terms that encode prior information are added to the sensor term.

In the following discussions, the terms $I^l$ and $I^h$ denote low-resolution input images and corresponding higher-resolution output images, respectively. As in typical upsampling methods, the upsampling method described herein includes a term that represents fidelity to the imaging process. Therefore, if $I^h$ is blurred and down sampled back to the low-resolution, then the result should be an image similar to the input image. In some embodiments, the reconstruction error may be modeled as a zero mean normal distribution $N(\sigma, \sigma^2 I)$:

$$P(I^l|I^h) = \left(\frac{1}{\sqrt{2\pi\sigma}}\right)^n \exp\left(\frac{-\|[I^l - DBI^h]\|_2^2}{2\sigma^2}\right) \quad (1)$$

In this example, n represents the number of low resolution pixels, B represents the blur operator, D represents the down sampling operator, and $\sigma$ represents the standard deviation of the reconstruction error. The remaining terms in the objective function may include a prior $P(I^h)$ on the high-resolution image. In some embodiments, a sparse derivative prior on first derivatives is included to promote a sharp result. In some embodiments, a derivative image $(g*I^h)$ may be modeled as an iid zero mean Generalized Gaussian Distribution GGD (0, s, $\beta$) at each pixel:

$$P(g*I^h) = \left(\frac{\beta}{2s\Gamma\left(\frac{1}{\beta}\right)}\right)^N \exp\left(\frac{-\|[g*I^h]\|_\beta^\beta}{s^\beta}\right) \quad (2)$$

In this example, N represents the number of high resolution pixels, g represents the derivative filter, * represents correlation, s and $\beta$ represent the spread and shape parameters, respectively, of the GGD, and $$\|x\|_\beta^\beta = \Sigma_i |x_i|^\beta$$

for a vector $x=(x_i)$. A sparse derivative prior may use $\beta<1$ to obtain a heavy tailed distribution that favors a solution that includes fewer large derivatives to one that includes many smaller derivatives in creating an intensity transition.

In some embodiments, a prior on second derivatives is incorporated in addition to first derivatives to strengthen the prior on the upsampling output. For natural images, the sparse derivative prior may be a good model for second derivatives and may provide a much better fit than a Gaussian prior, as seen in the example distributions in FIGS. 2A-2D. As previously noted, incorporating the second derivative terms may help promote smoothness along the output edges. In one embodiments, the method may use seven derivatives $I_x^h$, $I_y^h$, $I_{45°}^h$, $I_{135°}^h$, $I_{xx}^h$, $I_{yy}^h$, and $I_{xy}^h$ computed by the corresponding filters (in MATLAB® notation):

$g_x=[-1\ 1]$, $g_y=[-1\ 1]'$, $g_{45}=[-1\ 0;\ 0\ 1]$, $g_{135}=[0\ -1;\ 1\ 0]$, $g_{xx}=[1\ -2\ 1]$, $g_{yy}=[1\ -2\ 1]'$, and $g_{xy}=[1\ -1;\ -1\ 1]$.

It has been observed that using the first derivatives along the diagonal directions of 45 and 135 degrees may help reduce rectilinear image grid artifacts that show preference for the 0 and 90 degree directions.

As can be seen in FIGS. 2A-2D, the sparse derivative prior models both the tall sharp peak near zero and the large derivative outputs of natural images better than a Gaussian prior. A maximum likelihood Gaussian fit tends to underestimate the height of the peak. If the standard deviation of the Gaussian were decreased to better capture the tall spike, the large derivative outputs would be even less likely. Recall that the curvature of the isophote passing through a pixel (u, v) is given by $$K = \frac{I_x^2 I_{yy} - 2I_x I_y I_{xy} + I_y^2 I_{xx}}{\left[(I_x^2 + I_y^2)^{\frac{3}{2}}\right]}$$

where the derivatives are evaluated at the pixel (u, v). Modeling the peak near zero and making the low second derivative values as likely as they are in natural images corresponds to the fact that small second derivatives lead to low curvatures along image level lines and therefore more smoothness along edges. The sparse derivative prior may also model the occurrence of large derivative outputs well, which may be useful for capturing areas of high curvature.

In some embodiments, the simplifying, but incorrect, assumption may be made that the derivative filters are independent over space and orientation, thus leading $$P(I^h) = \prod_i P(g_i * I^h)$$

to the use of a prior $$P(I^h) = \prod_i \left(\frac{\beta_i}{2s_i \Gamma\left(\frac{1}{\beta_i}\right)}\right)^N \exp\left(\frac{-\|[g_i * I^h]\|_{\beta_i}^{\beta_i}}{s_i^{\beta_i}}\right) \quad (3)$$

In this example, the probability to be maximized is $P(I^h|I^l)$ $\alpha\, P(I^l|I^h)\, P(I^h)$, where the necessary terms are given by (1) and (3). Instead, the function $f(I^h) = -2\sigma^2(P(I^h|I^l))$ may be minimized. After some algebra and dropping constant terms, the objective function to be minimized becomes:

$$f(I^h) = \|I^l - DBI^h\|_2^2 + \sum_i w_i \|g_i * I^h\|_{\beta_i}^{\beta_i} \quad (4)$$

In this example, $w = (2\sigma^2)/(s_i^{\beta_i})$ and $g_i$ is a first or second derivative filter.

If the shape parameter $\beta$ of the GGDs were equal to 2, this could be modeled as a straightforward least squares problem. For the sparse derivative prior, $\beta < 1$ and the problem is no longer convex. Therefore, another optimization procedure may be used to minimize equation (4). In some embodiments, the upsampling method may use the Iteratively Re-weighted Least Squares (IRLS) procedure that repeatedly approximates this non-convex problem with a linear problem. In this case, the non-convex problem may be approximated with an ordinary weighted least squares problem, where the weight matrix depends on the current estimate for $I^h$. The IRLS procedure may provide a simple, effective technique for optimizing objective functions involving sparse derivative prior terms, generating a new potential higher-resolution image solution at each step. Minimizing equation (4) using IRLS may in some embodiments be potentially much faster than solving a labeling problem, as in other upsampling techniques. In some embodiments, a maximum of 10 IRLS iterations, each of which solves a weighted least squares problem, may be sufficient to produce excellent image upsampling results. In one embodiment, for each least squares problem, at most 20 iterations of an iterative linear solver (e.g., a MINRES solver, or conjugate gradient solver) may be run. In another embodiment, a direct linear solving technique (e.g., a Gaussian elimination solver), or another technique for solving linear systems may be run. At each IRLS step, such linear solvers may be applied to the result of the previous IRLS iteration or, for example, to an initial solution based on a bicubic result for the first IRLS iteration.

As previously noted, in some embodiments, the upsampling methods described herein may be applied independently to process each of two or more image planes. In one embodiment, the method may use the convolution of a box filter of diameter equal to the input dimension scale factor with a disk of radius 1 for the blur operator B, and may use a fixed set of parameters $\beta_i = 0.8$ and $w_i = 0.0001$. In other embodiments, other blur kernel parameter values may be applied, including, in some cases, parameter values specified by a user.

One embodiment of a method for performing upsampling, as described above, is illustrated by the flow chart in FIG. 3. The method may take as inputs a low-resolution image and an indication of an amount by which to increase the resolution of that input image. The output of the method may be a natural-looking version of the input image having a higher resolution than that of the input image. In this example, for a given upsampling operation, a potential higher-resolution image solution may be generated, as in 300. Using a previous example, for an input image of n pixels being upsampled by a factor of k and having eight possible intensity values for each output pixel, the number of potential solutions may be $8^{k'n}$, where $k' = k^2$. Note that in some embodiments, such as one employing an exhaustive search of the solution space (e.g., for small input and output images), all potential solutions may be generated before an evaluation of any of them is performed. In some such embodiments, the number of potential solutions to be generated and evaluated may be reduced by recognizing the high cost of a given potential solution and avoiding the generation and evaluation of similar potential solutions. In other embodiments, as described above, any number of potential solutions may be iteratively generated as the evaluation progresses. For example, an initial solution may be generated using default values for pixels of a candidate output image or by applying a bicubic or bilinear interpolation technique.

Figure 3:
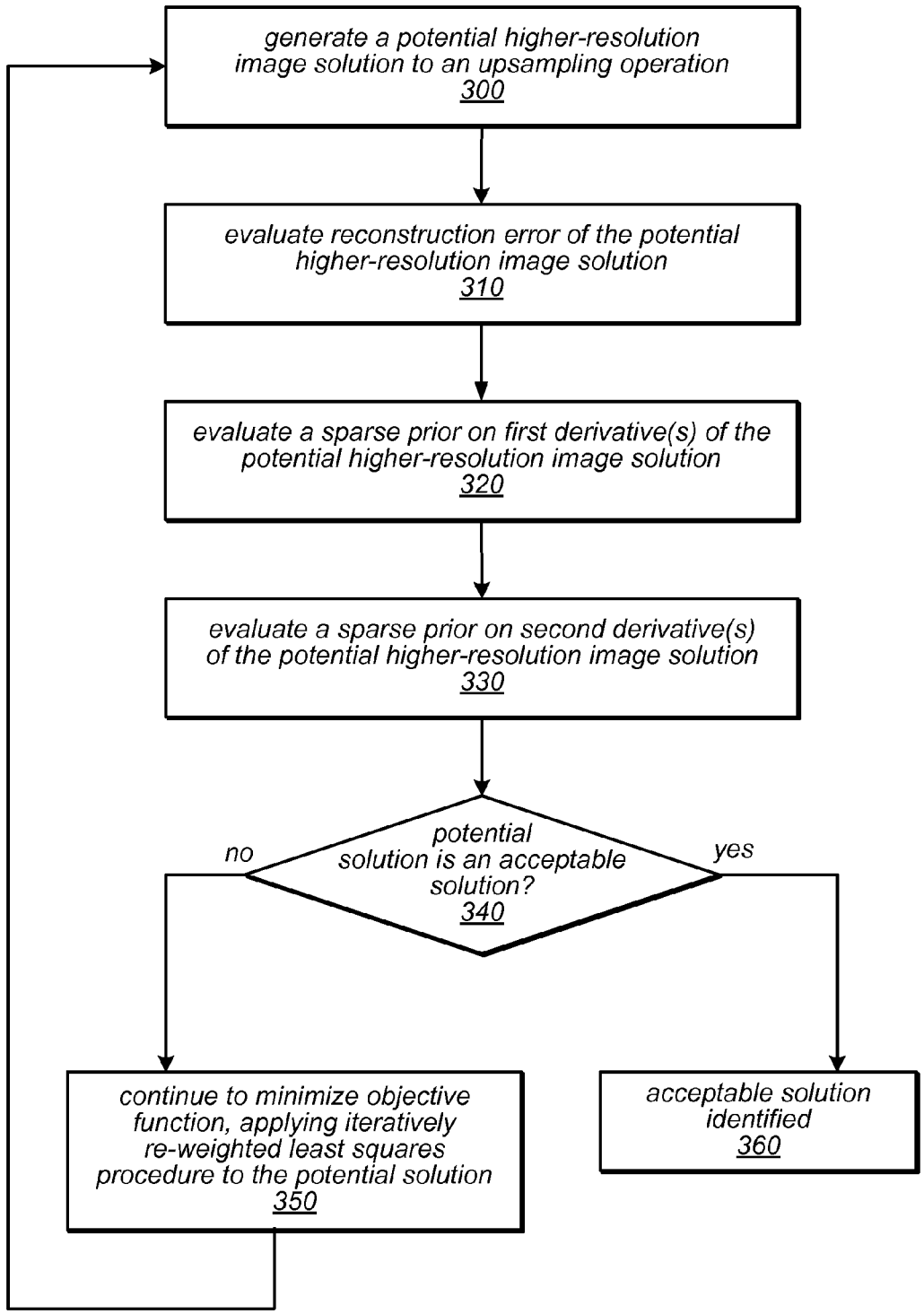
FIG. 3 is a flow diagram illustrating a method for determining an upsampling solution, according to one embodiment.

In the example illustrated in FIG. 3, the method may include evaluating the potential higher-resolution output image solutions using an objective function, as discussed above. The solution may be optimized by determining the solution having the minimum "cost" or "energy" with respect to this objective function (i.e. a global minimum), or a solution may be identified that corresponds to a local minimum cost, or that is the first evaluated solution that meets a given cost threshold with respect to the objective function, in various embodiments. The objective function may include both a fidelity term (e.g., one which penalizes solutions that do not look like the input image), and one or more priors (e.g., terms which may be used to bias the solution toward expected results). In the example illustrated in FIG. 3, the objective function may include a fidelity term used to evaluate the reconstruction error of the potential higher-resolution image, as in 310. As shown in this example, the objective function may also include one or more sparse prior terms to evaluate first derivative(s) of the potential higher-resolution image (as in 320) and one or more sparse prior terms to evaluate second derivative(s) of the potential higher-resolution image (as in 330).

As in the example illustrated in FIG. 1, the method illustrated in FIG. 3 may in some embodiments include determining the lowest-cost solution from among all possible potential higher-resolution output image solutions. In other embodiments each of one or more potential solutions may be evaluated until an acceptable solution is identified. For example if a given potential solution is acceptable (e.g., if it appears "natural" to the user, or meets specified cost criteria with respect to the objective function), the evaluation may be complete. This is shown as the positive exit from 340 and in 360. If the given potential solution is not acceptable, shown as the negative exit from 340, the method may include iterating on the solution to generate a more acceptable output image solution. In the example illustrated in FIG. 3, the method may include continuing to minimize the objective function, applying an iteratively re-weighted least squares procedure to the result of the previous iteration at each step (e.g., to the most recently evaluated potential solution, according to the results of the evaluation), as described above. This is illustrated in FIG. 3 as 350 and the feedback loop to 300.

Figure 4:
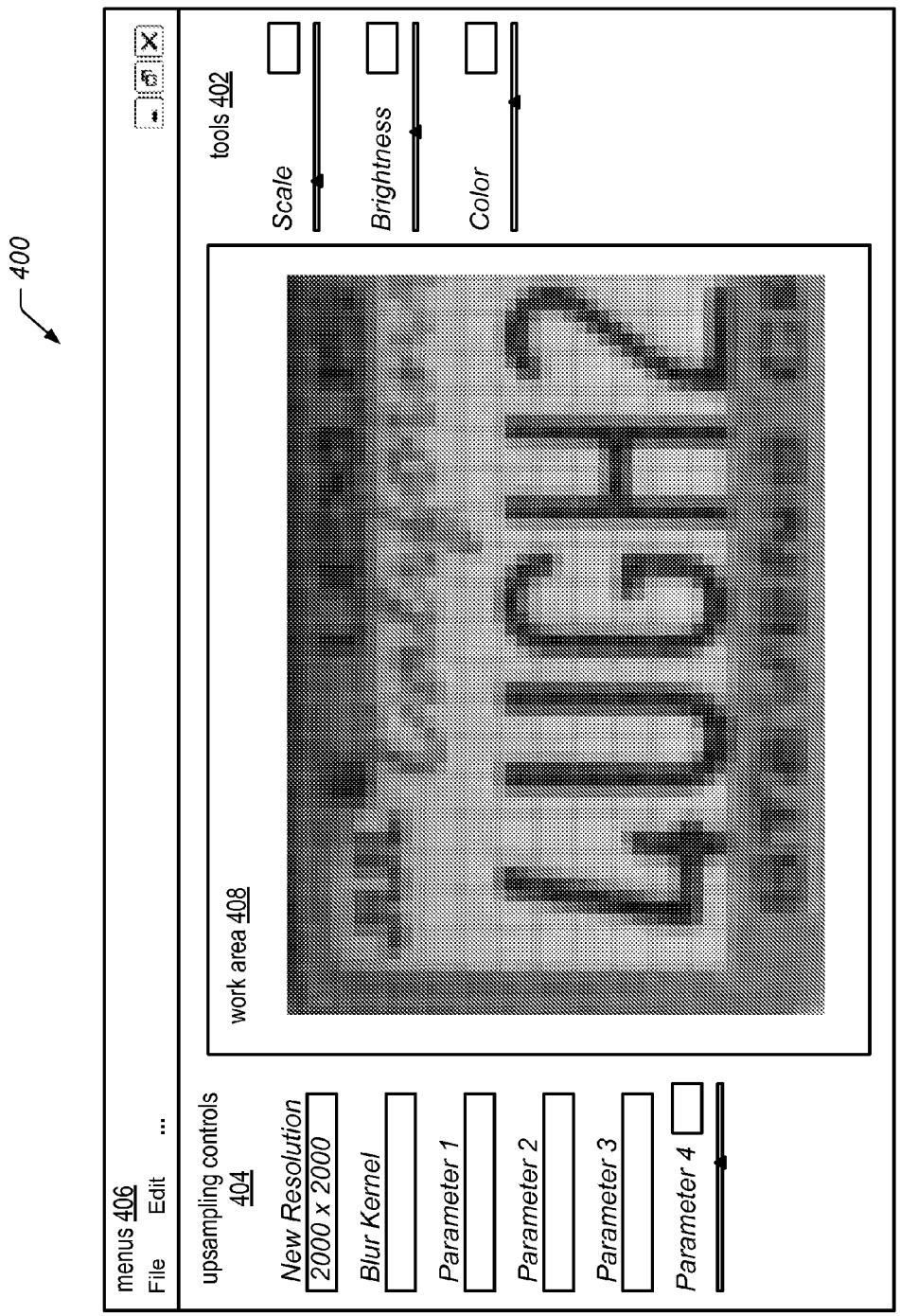
FIG. 4 illustrates a graphical user interface of an image editing application, according to one embodiment.

FIG. 4 illustrates one embodiment of a user interface of a graphics application that supports image editing (including image upsampling operations), as described herein. In this example, a user interface window 400 of the graphics application displays various frames that may be visible to a user during an image editing operation, according to one embodiment. The user interface illustrated in FIG. 4 is provided as an example of one possible implementation, and is not intended to be limiting. In this example, the display is divided into four regions or areas: menus 406, upsampling controls 404, general image editing tools 402, and work area 408. Menu area 406 may include one or more menus, for example menus used to navigate to other displays in the graphics application, open files, print or save files, undo/redo actions, and so on. In some embodiments, an input image to be upsampled may be identified by the user through the "file" option in menu area 406. This menu item may include, for example, a user-selectable pull-down option for importing an image from an identified file.

As illustrated in FIG. 4, the graphics application may provide a user interface including one or more user interface elements whereby a user may select and control various parameters of an upsampling operation, as described herein. In this example, user interface elements (e.g., user-modifiable controls such as alphanumeric text entry boxes and slider bars) usable to specify various parameters of an image upsampling operation are displayed in a frame in the upsampling controls area 404 along the left side of window 400. For example, in various embodiments, the user may be able to provide inputs specifying an upsampling factor, a target resolution for an upsampled output image, a blur kernel to be used in evaluating the fidelity of an output image to the input image (e.g., a box filter or Gaussian filter), or any of various parameters of an upsampling operation, including, but not limited to: an upsampling factor to be applied to an input image, spread and/or shape parameters of the GGD, number of IRLS iterations to apply, number and/or direction (angle) of first derivative terms, number and/or direction (angle) of second derivative terms, or whether to apply the upsampling operation to each color channel or to a grey scale or other derived representation of the input image.

In some embodiments, a user may be prompted to provide one or more of the inputs described above in response to invoking an image upsampling operation of the graphics application. In other embodiments, the graphics application may provide default values for any or all of these inputs. In still other embodiments, the graphics application may be configured to automatically determine the values of various parameters of the upsampling method. In one such embodiment, the graphics application may be configured to automatically determine a set of default values for one or more parameters of the upsampling operation dependent on characteristics of similar images (e.g., in a database of images). For example, if the input image to be upsampled is an outdoor image, the graphics application may be configured to apply a shape parameter to the upsampling operation that has been found to correlate well with 1000 outdoor images in a database to which it has access. In another embodiment, the graphics application may be configured to consult a database in which low-resolution and corresponding higher-resolution images have been evaluated to determine the ratio between the shape parameters of corresponding images. For example, a shape parameter value of 0.5 may be a good fit for low-resolution images, while a shape parameter value of 0.8 may be a good fit for higher-resolution images. In this example, the graphics application may be configured to apply a shape parameter to potential output images having this same ratio (0.5/0.8) with respect to a shape parameter that is a good fit for the input image. In some embodiments, the user may be allowed to override one or more default values for inputs of an upsampling operation using an interface similar to that illustrated in FIG. 4.

In this example, user interface elements (e.g., slider bars) usable to invoke various general image editing tools (e.g., to adjust the scale, brightness, color, or other parameters of an image or an object thereof) are displayed in a frame in the tools area 402 along the right side of window 400. In various embodiments, a graphics application that supports upsampling operations, as described herein, may provide user interface elements for controlling various aspects of other image editing and/or image compositing operations. In such embodiments, user interface of the graphics application may include tools not shown in FIG. 4 to support these operations, such as an "undo" tool that undoes the most recent user action in work area 408.

As illustrated by the example in FIG. 4, an image may be displayed in work area 408 in a large central frame in the center of window 400. In this example, work area 408 is the area in which an image being upsampled and/or otherwise modified is displayed as graphics editing operations are performed. In various embodiments, and at various times during an image editing and/or image upsampling operation, work area 408 may display all or a portion of a low-resolution input image, a higher-resolution output image, or an intermediate image of an operation in progress. In the example illustrated in FIG. 4, work area 408 displays a low-resolution input image of a license plate on which an upsampling operation may be performed.

While FIG. 4 shows various elements in tools 402 and upsampling controls 404 as alphanumeric text entry boxes and slider bars, other types of user interface elements, such as pop-up menus, pull-down menus, dials, radio buttons, or other user-modifiable controls may be used for specifying various parameters of an upsampling operation or other image editing operation of the graphics application.

Figure 5:
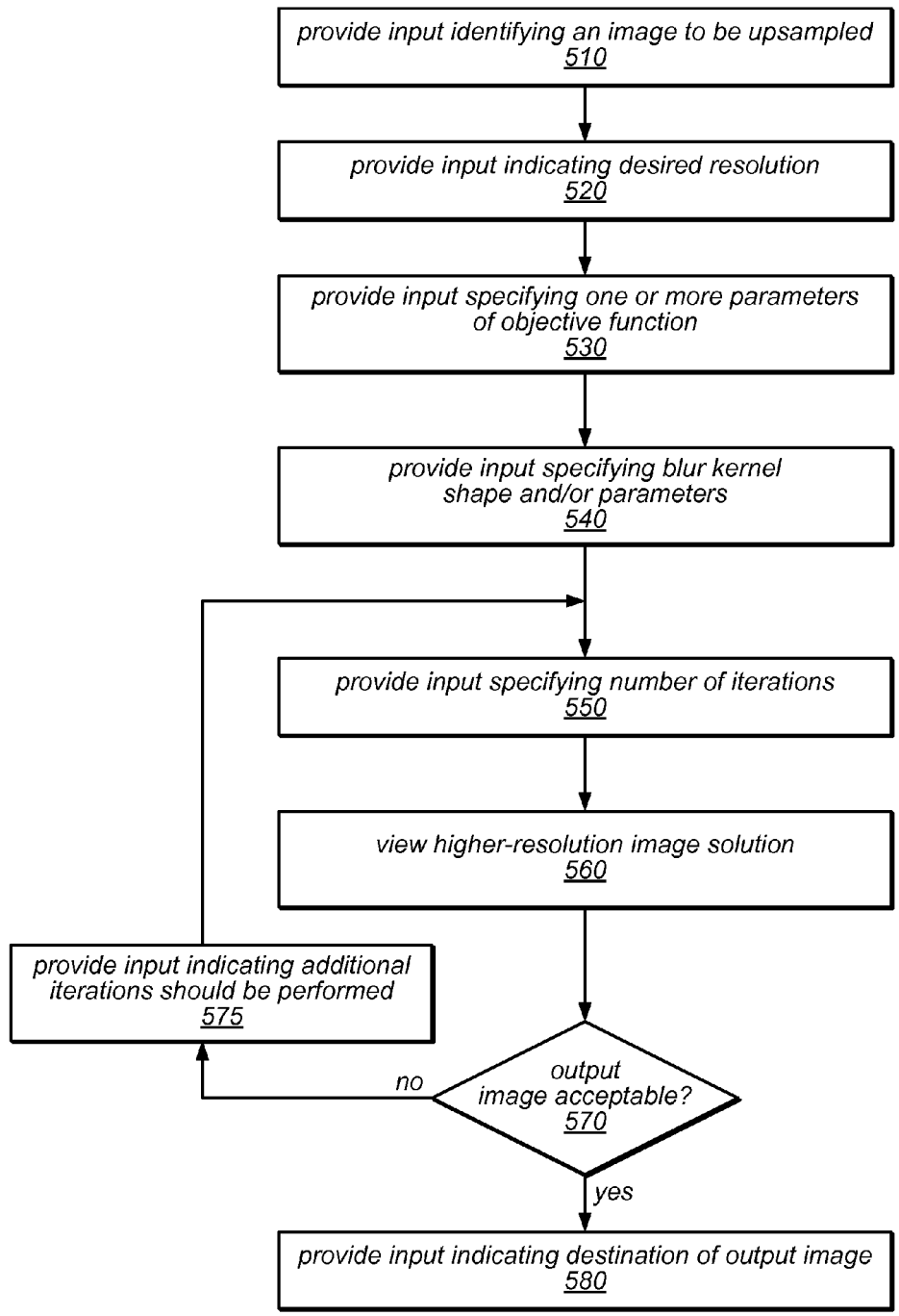
FIG. 5 is a flow diagram illustrating a method for using an image editing application to increase resolution of an input image, according to one embodiment.

One embodiment of a method for using a graphics application to perform an image upsampling operation, as described herein, is illustrated by the flow chart in FIG. 5. In this example, a user may provide input identifying an image on which to perform an upsampling operation, as in 510. As described above, in some embodiments this input image may be a low-resolution image imported from a file opened through a user interface of the graphics application. In other embodiments, the image may be selected from among active images already opened by or otherwise accessible by various operations of the graphics application.

As illustrated in FIG. 5, the method may include the user indicating the desired resolution of an upsampled version of the identified input image, as in 520. As described herein, in various embodiments, the user may explicitly specify the output resolution (e.g., 2000×2000 pixels), or may indicate the desired resolution by specifying an upsampling factor to be applied to the input image (e.g., ×4, or ×8). Note that while several examples included herein describe that the same upsampling factor is applied in both the horizontal and vertical directions, in some embodiments, a different upsampling factor may be applied to an image in the horizontal direction than in the vertical direction. In such embodiments, the method may include the user indicating the desired upsampling factors in each direction (e.g., x-upsampling×4, y-upsampling×8), or indicating the desired resolution of the output image (e.g., increasing the resolution of a 1000×1000 pixel input image to generate an output image having a resolution of 2000×4000 pixels).

As illustrated in FIG. 5 and described above, the method may include the user specifying one or more parameters of the objective function to be used to evaluate potential higher-resolution output image solutions, as in 530. For example, the user may provide input specifying spread and/or shape parameters of the GGD, the number and/or direction of first derivative terms of the objective function, the number and/or direction of second derivative terms of the objective function, or whether to apply the upsampling operation to each color channel or to a grey scale or other derived representation of the input image.

As illustrated in FIG. 5 and described above, the method may include the user specifying a blur kernel shape and/or parameters thereof, to be used in evaluating the fidelity of an output image to the input image (e.g., a box filter or Gaussian filter), as in 540.

As illustrated in FIG. 5 and described above, the method may include the user specifying the number of IRLS iterations to apply to the upsampling operation, as in 550. In the example illustrated in FIG. 5, the method may include the user viewing the higher-resolution output image solution generated by the graphics application using the upsampling methods described herein, as in 560. In some embodiments, the user may also view one or more intermediate images generated by the upsampling operation as the upsampling operation progresses. For example, in some embodiments, the graphics application may be configured to display an intermediate solution after each IRLS step.

If the higher-resolution image solution is acceptable to the user, shown as the positive output from 570, the user may be prompted to provide input indicating a destination for data representing the output image, as in 580. For example, the user may provide input indicating that the output image should be saved in a particular file or in a data structure accessible to the graphics application or another application. For example the user may provide input indicating that the output image should be displayed and made available to other operations within the graphics application as part of a collection of active images within an ongoing image editing or image compositing exercise. In some embodiments in which intermediate image solutions are displayed during processing of the upsampling operation, the user may provide input indicating that an intermediate image is acceptable as an output image, which may result in the upsampling operation being completed before the specified number of iterations has been performed. If the output image is not acceptable to the user, indicated by the negative exit from 570, the user may provide input indicating that additional iterations of the upsampling procedure should be performed in an attempt to improve the output image, as in 575. For example, in some embodiments, the user may be prompted to provide input specifying a number of additional iterations to perform.

Figure 6A:
FIGS. 6A-6H illustrate various input and output images of image upsampling operations, according to one embodiment.
Figure 6B:
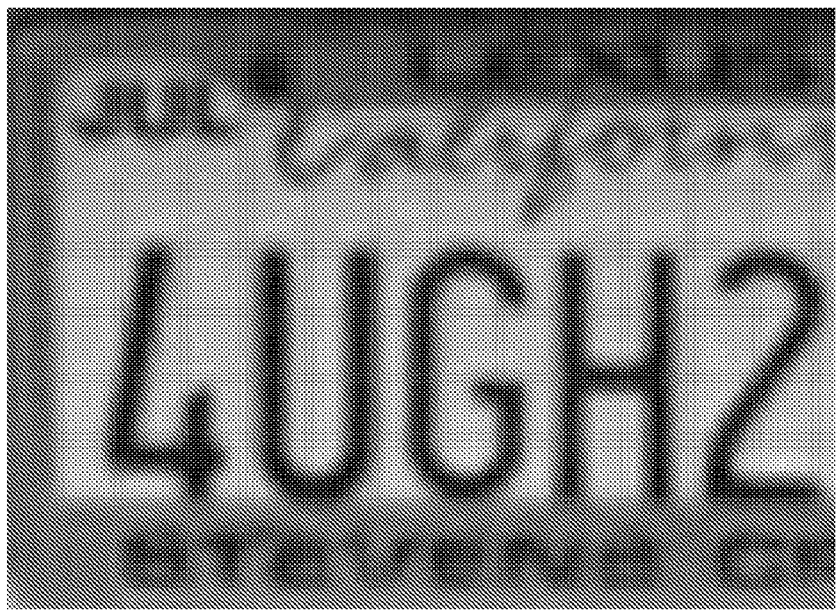
Figure 6C:
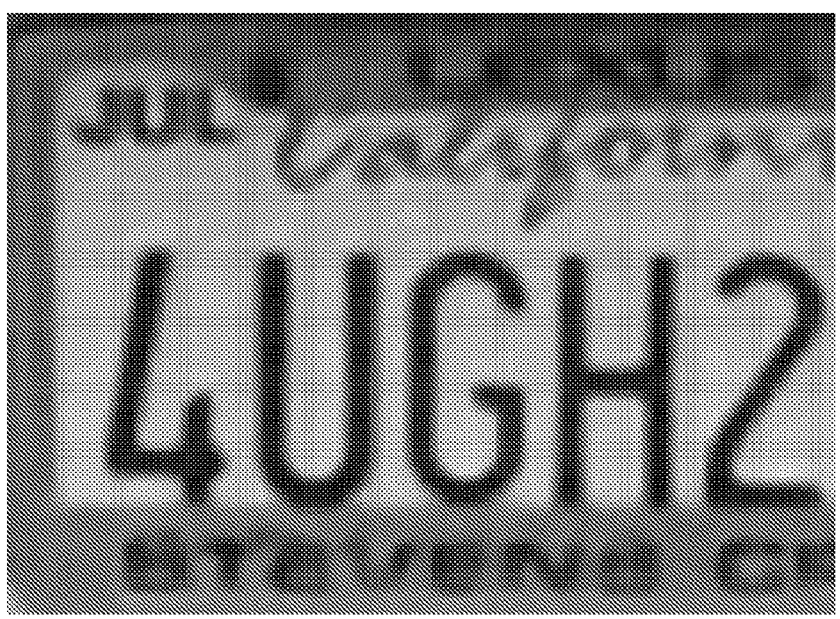

The system and methods for performing image upsampling using sparse priors on first and second derivatives may be further illustrated by way of the example images in FIGS. 6A-6H. These images illustrate the results of the application of the methods described herein, and comparisons of those methods to upsampling techniques that do not depend on sparse derivative priors on second derivatives, such as bicubic upsampling. FIG. 6A illustrates a low-resolution input image, license plate. FIG. 6B illustrates the results of upsampling license plate using bicubic interpolation, while FIG. 6C illustrates the result of upsampling license plate using the methods described above that are dependent on sparse derivative priors on first and second derivatives. This example illustrates a very sharp result of an upsampling operation using sparse priors on first and second derivatives (FIG. 6C), with greatly increased readability of the text over that of the input image (FIG. 6A). In this example, there is also a noticeable difference in the relative sharpness of the lettering in FIGS. 6B and 6C. In this example, the sharpness and edge smoothness of the letters in the sparse derivative prior result illustrated in FIG. 6C is noticeably improved compared to those of the bicubic upsampling result illustrated in FIG. 6B.

Figure 6D:
Figure 6E:

Another example, based on a second image, handicap sign, is illustrated in FIGS. 6D-6E. FIG. 6D illustrates an upsampled version of the image resulting from bicubic interpolation, while FIG. 6E illustrates a higher-resolution version of handicap sign resulting from the performance of an upsampling operation using sparse derivative priors on first and second derivatives. In this example, the lettering in the sign is better resolved in the upsampling result illustrated in FIG. 6E than in the bicubic interpolation result illustrated in FIG. 6D.

Figure 6F:
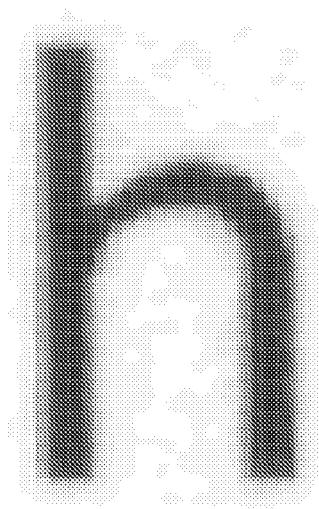
Figure 6G:
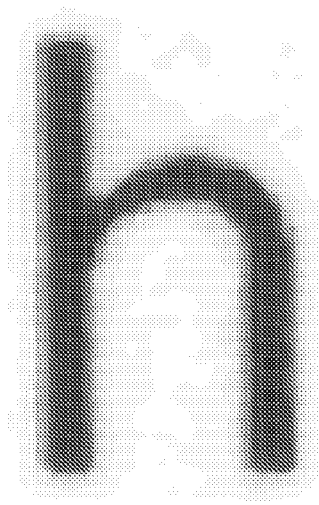
Figure 6H:
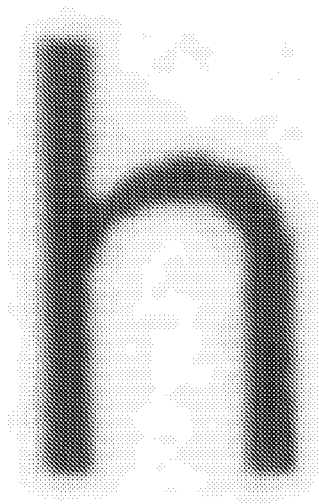

As previously noted, in various embodiments, the upsampling operations described herein may use sparse derivative priors on different numbers of first and second derivatives. FIGS. 6F-6H illustrate the results of upsampling operations using different sets of sparse derivative priors. In this example, the image in FIG. 6H illustrates the result of an upsampling operation on a low-resolution image (20×20 pixels) using the sparse derivative prior on a set of four first derivatives, $I_c$, $I_y$, $I_{45°}$, $I_{135°}$, and three second derivatives, $I_{xx}$, $I_{yy}$, $I_{xy}$. The image in FIG. 6G illustrates the result of upsampling using a sparse derivative prior only on the four first of these derivatives, $I_x$, $I_y$, $I_{45°}$, $I_{135°}$. Note that the use of the sparse derivative prior on second derivatives results in more smoothness along edges, in this example. The image in FIG. 6F illustrates the result of upsampling using the sparse derivative prior only on the two first derivatives, $I_x$, $I_y$. Note that, in this example, the jaggy artifacts are even worse than when using four first derivative filters and that they favor the horizontal and vertical directions. This example illustrates that the use of derivatives at angles other than right angles (e.g., the first derivatives $I_{45°}$, $I_{135°}$) may help reduce rectilinear artifacts, in some embodiments.

The image upsampling methods described herein may produce sharp results that are also smooth along edges. The examples described herein illustrate that applying the sparse derivative prior to second derivatives may result in more smoothness along edges than just using first derivatives or using bicubic interpolation.

Figure 7:
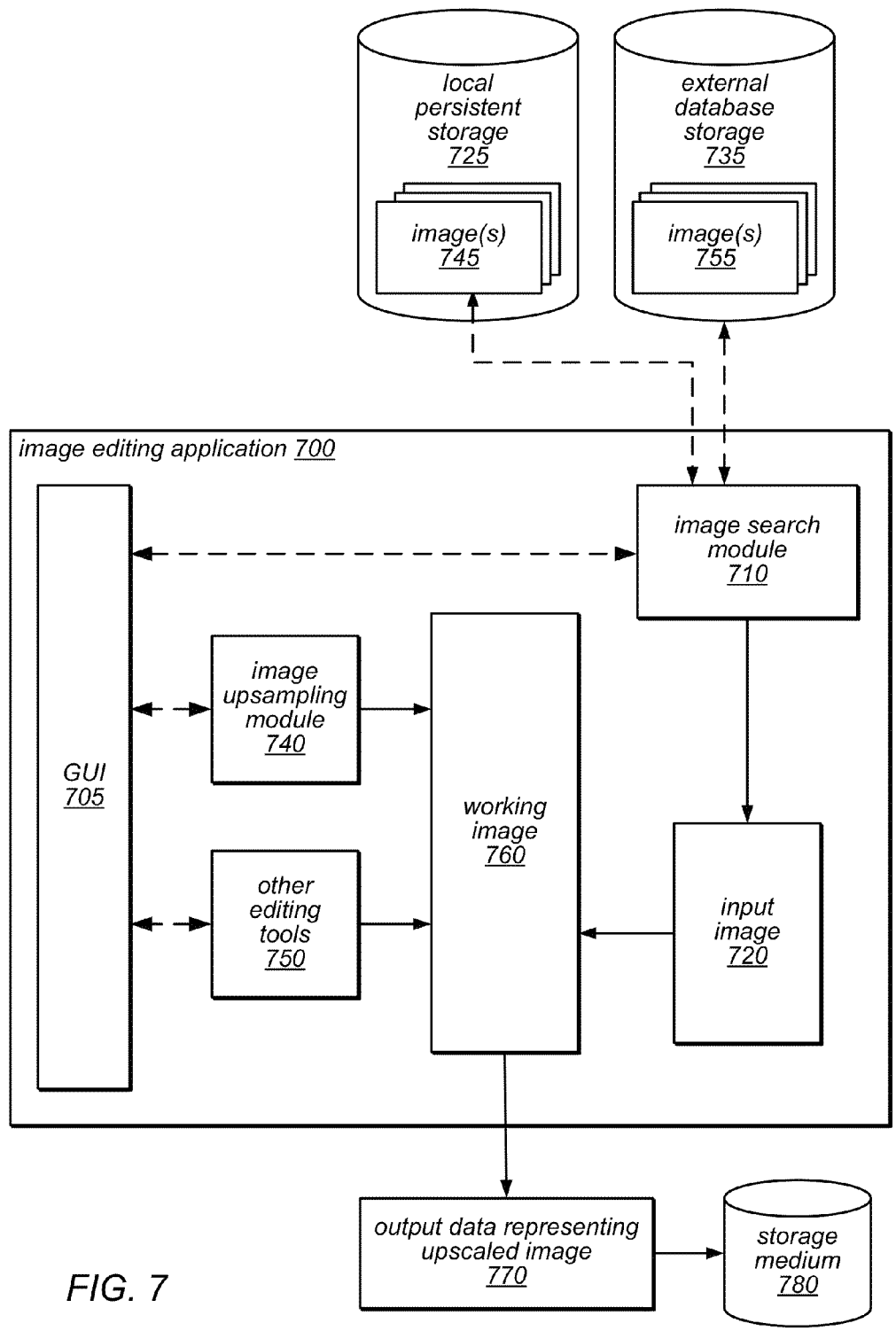
FIG. 7 illustrates various elements of an image editing application, according to one embodiment.

As described herein, an image editing application may in some embodiments provide a framework for performing image upsampling. One such image editing application is illustrated in FIG. 7, according to one embodiment. In this example, an image editing application 700 includes a graphical user interface (GUI) 705, such as the user interface described herein and illustrated in FIG. 4.

Graphical user interface 705 may provide a user with access to various editing tools and input mechanisms to allow the user operate on an input image, as described herein. For example, in the embodiment illustrated in FIG. 7, GUI 705 may provide the user access to image search module 710, image upsampling module 740, and other editing tools 750. These modules and tools may be usable to find and acquire images, to upsample images, and/or to modify various parameters of input and/or upsampled images to create new versions of those images, as described herein.

In this example, image editing application 700 also includes one or more data structures for storing or referencing a collection of images (shown as 720), e.g., structures storing data representing various images in memory local to image editing application 700 during modification of an image, and a data structure 760 storing data representing the working image (e.g., storing data representing the image being modified in memory local to image editing application 700 while in the process of upsampling and/or otherwise modifying the working image).

In the example illustrated in FIG. 7, image search module 710 may perform image searches dependent on various criteria, including user-specified criteria. In this example, image search module 710 may have access to local persistent storage 725 and/or external database storage 735 from which various images 745 and 755 may be returned in response to a user-initiated search for images. In response to user-selection of images from among the search results, image search module 710 may acquire the selected images and may add them to input images 720 for use in an image editing exercise.

In various embodiments, once an image editing exercise (e.g., one that includes an upsampling operation) has been completed, or at any intermediate point in the exercise, data representing the upsampled image may be output, as in 770. For example, in response to user input, data representing an upsampled image may be exported from image editing application 700 for publishing on a website, for display, or for printing, and/or may be written to a computer readable storage medium, such as storage medium 780 in FIG. 7, for archival purposes and/or to be accessible to image editing application 700 or another application subsequent to the editing exercise.

Figure 8:
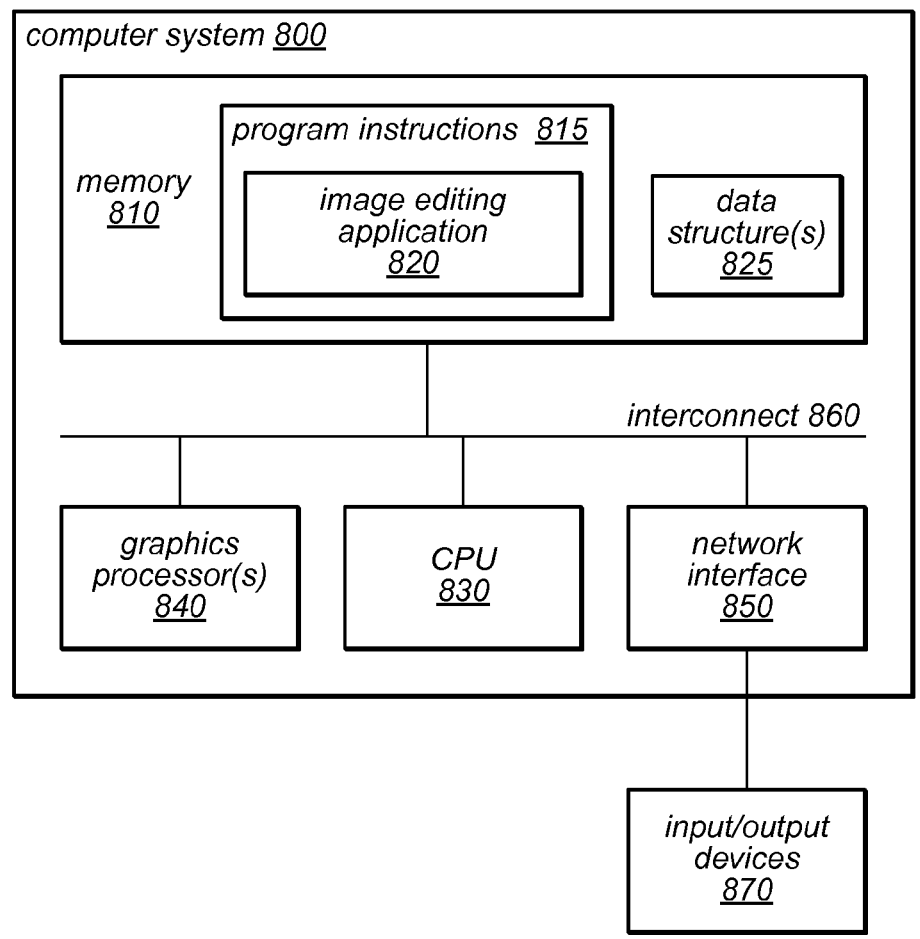
FIG. 8 illustrates a computer system configured to implement an image editing application, according to one embodiment.

The methods described herein for upsampling images (e.g., within an image editing application) may be implemented by a computer system configured to provide the functionality described. FIG. 8 is a block diagram illustrating one embodiment of a computer system 800 configured to implement such image upsampling operations. An image editing application such as image editing application 820 may be configured to perform various image editing functions and to render new images accordingly. In some embodiments, a user may invoke operations to search for and/or acquire images, increase the resolution of those images, or otherwise alter an input image (or portion thereof) through a user interface of image editing application 820. Image editing application 820 may be configured to perform these operations using an image upsampling module and other editing tools, according to various embodiments, and may employ the methods described herein for upsampling images within the framework provided by image editing application 820. Image editing application 820 may be configured to render an upsampled image to a separate window, or directly into the same frame buffer containing a corresponding input image, in different embodiments.

Image editing application 820 may represent various types of graphics applications, such as painting, publishing, photography, games, animation, and other applications that may include program instructions executable to provide the functionality described herein. Additionally, image editing application 820 may utilize a graphics processor 840 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 840 may implement a number of graphics primitive operations in a way that makes executing them much faster than drawing directly to the screen with a host central processing unit (CPU), such as CPU 830. In various embodiments, the methods disclosed herein for image upsampling may be implemented by program instructions configured for parallel execution on two or more such GPUs. The GPU 800 may implement one or more application programmer interfaces (APIs) that permit programmers to invoke the functionality of the GPU. Suitable GPUs may be commercially available from vendors such as NVIDIA Corporation, ATI Technologies, and others.

Note that functionality and/or features described herein as being part of, or performed by, image editing application 820 may, in some embodiments, be part of, or performed by, one or more graphics processors, such as graphics processor 840. As described above, in some embodiments, image editing application 820 may be configured to render upsampled and/or otherwise modified images into a different window than input images.

Upsampling of images, as described herein, may be implemented on various types of computer systems. Referring again to FIG. 8, computer system 800 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Image editing application 820, which may be configured to implement image upsampling operations, as described herein, may be provided as a computer program product, or software, that may include a computer-readable storage medium having stored thereon instructions, which may be used to program a computer system (or other electronic devices) to implement image upsampling using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 8, computer system 800 may include one or more processor units (CPUs) 830. Processors 830 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 800, such as various versions of Unix, Linux, Windows™ from Microsoft Corporation, MacOS™ from Apple Corporation, or any other operating system that enables the operation of software on a hardware platform.

The computer system 800 may also include one or more system memories 810 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 800 via interconnect 860. Memory 810 may include other types of memory as well, or combinations thereof. One or more of memories 810 may include program instructions 815 executable by one or more of processors 830 to implement aspects of the image upsampling techniques described herein. Program instructions 815, which may include program instructions configured to implement image editing application 820, may be partly or fully resident within the memory 810 of computer system 800 at any point in time. Alternatively, program instructions 815 may be provided to GPU 840 for performing image editing operations (or portions thereof) on GPU 840 using one or more of the techniques described herein. In some embodiments, the techniques described herein may be implemented by a combination of program instructions 815 executed on one or more processors 830 and one or more GPUs 840, respectively. Program instructions 815 may also be stored on an external storage device (not shown) accessible by the processor(s) 830 and/or GPU 840, in some embodiments. Any of a variety of such storage devices may be used to store the program instructions 815 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 830 and/or GPU 840 through one or more storage or I/O interfaces including, but not limited to, interconnect 860 or network interface 850, as described herein. In some embodiments, the program instructions 815 may be provided to the computer system 800 via any suitable computer-readable storage medium including memory 810 and/or external storage devices described above. Memory 810 may also be configured to implement one or more data structures 825, such as one or more data structures configured to store data representing one or more input images, and/or upsampled images, as described herein. Data structures 825 may be accessible by processor(s) 830 and/or GPU 840 when executing image editing application 820 or other program instructions 815.

As shown in FIG. 8, processor(s) 830 may be coupled to one or more of the other illustrated components by at least one communications bus, such as interconnect 860 (e.g., a system bus, LDT, PCI, ISA, or other communication bus type), and a network interface 850 (e.g., an ATM interface, an Ethernet interface, a Frame Relay interface, or other interface). The CPU 830, the network interface 850, and the memory 810 may be coupled to the interconnect 860. It should also be noted that one or more components of system 800 may be located remotely and accessed via a network.

As noted above, in some embodiments, memory 810 may include program instructions 815, comprising program instructions configured to implement image editing application 820, as described herein. Image editing application 820 may be implemented in various embodiments using any desired programming language, scripting language, or combination of programming languages and/or scripting languages, e.g., C, C++, C#, Java™, Perl, etc. For example, in one embodiment, image editing application 820 may be JAVA based, while in another embodiments, it may be implemented using the C or C++ programming languages. In other embodiments, image editing application 820 may be implemented using specific graphic languages specifically for developing programs executed by specialize graphics hardware, such as GPU 840. In addition, image editing application 820 may be embodied on memory specifically allocated for use by graphics processor(s) 840, such as memory on a graphics board including graphics processor(s) 840. Thus, memory 810 may represent dedicated graphics memory as well as general-purpose system RAM, in various embodiments. Memory 810 may in some embodiments also include a data store configured to store image data for one or more input images and/or output images, in various embodiments. Other information not described herein may be included in memory 810 and may be used to implement the methods described herein and/or other functionality of computer system 800.

Network interface 850 may be configured to enable computer system 800 to communicate with other computers, systems or machines, such as across a network. For example, an image search module of image editing application 820 may perform images searches by accessing one or more external image databases via network interface 850. Network interface 850 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 800 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 850 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 840 may be implemented in a number of different physical forms. For example, GPU 840 may take the form of a dedicated graphics card, an integrated graphics solution and/or a hybrid solution. GPU 840 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 8, memory 810 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU, as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 840 and the rest of the computer system 800 may travel through a graphics card slot or other interface, such as interconnect 860 of FIG. 8.

Computer system 800 may also include one or more additional I/O interfaces, such as interfaces for one or more user input devices 870, or such devices may be coupled to computer system 800 via network interface 850. For example, computer system 800 may include interfaces to a keyboard, a mouse or other cursor control device, a joystick, or other user input devices 870, in various embodiments. Additionally, the computer system 800 may include one or more displays (not shown), coupled to processors 830 and/or other components via interconnect 860 or network interface 850. Such input/output devices may be configured to allow a user to interact with image editing application 820 to request or invoke various image editing operations and/or to specify various upsampling parameters, image editing parameters, and/or other configurable options available to the user when upsampling images or otherwise modifying images while executing image editing application 820. For example, they may be configured to allow a user to specify the resolution or resolution increase factor to be applied to an input image, to specify various parameters of an objective function, to specify a number of iterations to be performed by an upsampling operation, etc. It will be apparent to those having ordinary skill in the art that computer system 800 may also include numerous other elements not shown in FIG. 8.

Note that program instructions 815 may be configured to implement an image editing application 820 as a stand-alone application, or as a module of another graphics application or graphics library, in various embodiments. For example, in one embodiment program instructions 815 may be configured to implement graphics applications such as painting, publishing, photography, games, animation, and/or other applications, and may be configured to upsample and/or otherwise modify images as part of one or more of these graphics applications. In another embodiment, program instructions 815 may be configured to implement the image upsampling techniques described herein in one or more functions called by another graphics application executed on GPU 840 and/or processor(s) 830. Program instructions 815 may also be configured to render images and present them on one or more displays as the output of an image upsampling operation and/or to store image data for upsampled images in memory 810 and/or an external storage device(s), in various embodiments. For example, an image editing application 820 included in program instructions 815 may utilize GPU 840 when upsampling, modifying, rendering, or displaying images in some embodiments.

While various image upsampling techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations described herein may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
 one or more processors; and
 a memory coupled to the one or more processors and storing program instructions executable by the one or more processors to implement:
  accessing data representing an input image to be upsampled;
  for each of a plurality of potential upsampling solutions:
   evaluating the potential upsampling solution with respect to an objective function, wherein the objective function is dependent on a sparse derivative prior in which sparse derivative prior probabilities for one or more second derivatives of the potential upsampling solution are multiplied by sparse derivative prior probabilities for one or more first derivatives of the potential upsampling solution;
  identifying one of the plurality of potential upsampling solutions as an acceptable solution, dependent on said evaluating;
  storing the identified solution as a higher-resolution version of the input image.

2. The system of claim 1, wherein the objective function is dependent on a sparse derivative prior on two or more second derivatives of the potential upsampling solution, and wherein one of the two or more second derivatives of the potential upsampling solution comprises a derivative in a given direction on a result of a first derivative of the potential upsampling solution in a different direction.

3. The system of claim 1, wherein the objective function is dependent on a sparse derivative prior on a derivative of the potential upsampling solution in a direction other than horizontal or vertical.

4. The system of claim 1, wherein the program instructions are further executable by the one or more processors to implement an interface through which one or more of an upsampling factor, a target output image resolution, a target relative resolution, a number of derivatives, an order of a derivative, a direction of a derivative, or a number of solution iterations is configurable by a user.

5. The system of claim 1, wherein the objective function is further dependent on a fidelity term configured to bias said evaluating toward potential upsampling solutions that closely resemble the input image.

6. The system of claim 5, wherein the fidelity term is dependent on a blur kernel.

7. The system of claim 6, wherein the program instructions are further executable by the one or more processors to implement an interface through which a shape or spread of the blur kernel is configurable by a user.

8. The system of claim 6, wherein the blur kernel comprises a box filter convolved with a disk.

9. The system of claim 1, wherein said identifying one of the plurality of potential upsampling solutions as an acceptable solution comprises minimizing the objective function using an iteratively re-weighted least squares procedure.

10. The system of claim 1, wherein the objective function models the sparse derivative prior as a zero mean Generalized Gaussian Distribution.

11. The system of claim 1, wherein the program instructions are further executable by the one or more processors to implement determining an upsampling factor by which resolution of the input image is to be increased.

12. The system of claim 1, wherein said evaluating, said identifying, and said storing are performed on each of two or more image planes of the input image.

13. The system of claim 1, wherein said evaluating, said identifying, and said storing are performed on a portion of the input image that is less than the entire input image.

14. The system of claim 13, wherein the portion of the input image comprises pixels near an edge of an image element in the input image.

15. The system of claim 1,
wherein the program instructions are further executable by the one or more processors to implement:
converting the input image to a different image representation than that of the input image; and
wherein said evaluating, said identifying, and said storing are performed on the different image representation of the input image.

16. The system of claim 1, wherein the one or more processors comprise at least one of: a general-purpose central processing unit (CPU) or a graphics processing unit (GPU).

17. A non-transitory computer-readable storage medium, storing program instructions computer-executable to implement:
accessing data representing an input image to be upsampled;
for each of a plurality of potential upsampling solutions:
evaluating the potential upsampling solution with respect to an objective function, wherein the objective function is dependent on a sparse derivative prior in which sparse derivative prior probabilities for one or more second derivatives of the potential upsampling solution are multiplied by sparse derivative prior probabilities for one or more first derivatives of the potential upsampling solution;
identifying one of the plurality of potential upsampling solutions as an acceptable solution, dependent on said evaluating;
storing the identified solution as a higher-resolution version of the input image.

18. The storage medium of claim 17, wherein the objective function is dependent on a sparse derivative prior on two or more second derivatives of the potential upsampling solution, and wherein one of the two or more second derivatives of the potential upsampling solution comprises a derivative in a given direction on a result of a first derivative of the potential upsampling solution in a different direction.

19. The storage medium of claim 17, wherein the objective function is dependent on a sparse derivative prior on a derivative of the potential upsampling solution in a direction other than horizontal or vertical.

20. The storage medium of claim 17, wherein the program instructions are further computer-executable to implement an interface through which one or more of an upsampling factor, a target output image resolution, target relative resolution, a number of derivatives, an order of a derivative, a direction of a derivative, or a number of solution iterations is configurable by a user.

21. The storage medium of claim 17, wherein the objective function is further dependent on a fidelity term configured to bias said evaluating toward potential upsampling solutions that closely resemble the input image.

22. The storage medium of claim 17, wherein said identifying one of the plurality of potential upsampling solutions as an acceptable solution comprises minimizing the objective function using an iteratively re-weighted least squares procedure.

23. The storage medium of claim 17, wherein the objective function models the sparse derivative prior as a zero mean Generalized Gaussian Distribution.

24. The storage medium of claim 17, wherein said evaluating, said identifying, and said storing are performed on each of two or more image planes of the input image.

25. The storage medium of claim 17, wherein said evaluating, said identifying, and said storing are performed on a portion of the input image that is less than the entire input image.

26. The storage medium of claim 17,
wherein the program instructions are further computer-executable to implement:
converting the input image to a different image representation than that of the input image; and
wherein said evaluating, said identifying, and said storing are performed on the different image representation of the input image.

27. A method, comprising
performing, by a computer:
accessing data representing an input image to be upsampled;
for each of a plurality of potential upsampling solutions:
evaluating the potential upsampling solution with respect to an objective function, wherein the objective function is dependent on a sparse derivative prior in which sparse derivative prior probabilities for one or more second derivatives of the potential upsampling solution are multiplied by sparse derivative prior probabilities for one or more first derivatives of the potential upsampling solution;
identifying one of the plurality of potential upsampling solutions as an acceptable solution, dependent on said evaluating; and storing the identified solution as a higher-resolution version of the input image.

28. The method of claim 27, wherein the objective function is dependent on a sparse derivative prior on a derivative of the potential upsampling solution in a direction other than horizontal or vertical.

29. The method of claim 27, wherein the objective function is further dependent on a fidelity term configured to bias said evaluating toward potential upsampling solutions that closely resemble the input image.

30. The method of claim 27, wherein said identifying one of the plurality of potential upsampling solutions as an acceptable solution comprises minimizing the objective function using an iteratively re-weighted least squares procedure.

31. The method of claim 27, wherein the objective function models the sparse derivative prior as a zero mean Generalized Gaussian Distribution.

32. The method of claim 27, wherein said evaluating, said identifying, and said storing are performed on each of two or more image planes of the input image.

33. The method of claim 27, wherein said evaluating, said identifying, and said storing are performed on a portion of the input image that is less than the entire input image.

34. The method of claim 27, further comprising using the computer to perform:
  converting the input image to a different image representation than that of the input image;
  wherein said evaluating, said identifying, and said storing are performed on the different image representation of the input image.

35. A computer-implemented method, comprising:
  executing instructions on a specific apparatus so that binary digital electronic signals representing an input image to be upsampled are accessed in memory;
  executing instructions on said specific apparatus so that binary digital electronic signals representing each of a plurality of potential upsampling solutions are evaluated with respect to an objective function, wherein the objective function is dependent on a sparse derivative prior in which sparse derivative prior probabilities for one or more second derivatives of the potential upsampling solution are multiplied by sparse derivative prior probabilities for one or more first derivatives of the potential upsampling solution;
  executing instructions on said specific apparatus so that binary digital electronic signals representing one of the plurality of potential upsampling solutions is identified as an acceptable solution, dependent on said evaluating; and
  storing the binary digital electronic signals representing the identified solution as a higher-resolution version of the input image in a memory location of said specific apparatus for later use.

* * * * *

UNITED STATES PATENT AND TRADEMARK OFFICE
CERTIFICATE OF CORRECTION

PATENT NO. : 8,369,653 B1
APPLICATION NO. : 12/395316
DATED : February 5, 2013
INVENTOR(S) : Scott D. Cohen It is certified that error appears in the above-identified patent and that said Letters Patent is hereby corrected as shown below:

In the Claims:

Column 24, line 21, insert -- a -- between "...resolution," and "target...", therefor.

Column 24, line 52, delete "comprising" and insert -- comprising: --, therefor.

Signed and Sealed this
Twenty-third Day of April, 2013

Teresa Stanek Rea
*Acting Director of the United States Patent and Trademark Office*